(12) United States Patent
Park et al.

(10) Patent No.: US 9,684,525 B2
(45) Date of Patent: Jun. 20, 2017

(54) APPARATUS FOR CONFIGURING OPERATING SYSTEM AND METHOD THEREFOR

(71) Applicant: POSTECH ACADEMY—INDUSTRY FOUNDATION, Gyeongbuk (KR)

(72) Inventors: Chan Ik Park, Gyeongsangbuk-do (KR); Se Jin Park, Daegu (KR)

(73) Assignee: POSTECH ACADEMY—INDUSTRY FOUNDATION, Geongbuk (KR)

( * ) Notice: Subject to any disclaimer, the term of this patent is extended or adjusted under 35 U.S.C. 154(b) by 276 days.

(21) Appl. No.: 14/335,798

(22) Filed: Jul. 18, 2014

(65) Prior Publication Data

US 2015/0026447 A1   Jan. 22, 2015

(30) Foreign Application Priority Data

Jul. 18, 2013   (KR) ........................ 10-2013-0084601

(51) Int. Cl.
*G06F 9/445* (2006.01)
*G06F 9/50* (2006.01)
*G06F 21/53* (2013.01)
*G06F 9/46* (2006.01)

(52) U.S. Cl.
CPC .......... *G06F 9/44505* (2013.01); *G06F 9/468* (2013.01); *G06F 9/50* (2013.01); *G06F 21/53* (2013.01)

(58) Field of Classification Search
CPC ........ G06F 9/44505; G06F 9/50; G06F 21/53; G06F 9/468
See application file for complete search history.

(56) References Cited

U.S. PATENT DOCUMENTS

| 7,509,639 B2* | 3/2009 | Worley, Jr. ............ G06F 9/468 713/164 |
| 8,161,481 B2* | 4/2012 | May ...................... G06F 9/4881 707/704 |
| 8,392,988 B2* | 3/2013 | Ohta ...................... G06F 21/52 726/22 |
| 2002/0049744 A1* | 4/2002 | Nakos ...................... G06F 8/70 |
| 2003/0009685 A1 | 1/2003 | Choo et al. |

(Continued)

FOREIGN PATENT DOCUMENTS

| KR | 20010011133 A | 2/2001 |
| KR | 20130119862 A | 11/2013 |

(Continued)

*Primary Examiner* — Abdelmoniem Elamin
(74) *Attorney, Agent, or Firm* — Osha Liang LLP

(57) ABSTRACT

Disclosed are an apparatus and a method for configuring an operating system. An apparatus for configuring an operating system may comprise a system resource management part managing system resources by assigning control permission for system resources which interwork with the operating system to a first domain of the operating system; and a system operation part executing an application program in a second domain of the operating system which is independent from the first domain by utilizing the system resources managed by the system resource management part. Therefore, performance of the operating system may be enhanced at the same time of supporting high security of the operating system so that reliability of the operating system can also be enhanced.

12 Claims, 5 Drawing Sheets

(56) References Cited

U.S. PATENT DOCUMENTS

| | | | |
|---|---|---|---|
| 2004/0177243 A1* | 9/2004 | Worley, Jr. | G06F 9/468 |
| | | | 713/2 |
| 2006/0150203 A1 | 7/2006 | Bendapudi et al. | |
| 2008/0104600 A1* | 5/2008 | May | G06F 9/524 |
| | | | 718/103 |
| 2008/0104695 A1 | 5/2008 | Fassino et al. | |
| 2009/0158299 A1* | 6/2009 | Carter | G06F 9/4843 |
| | | | 719/319 |
| 2010/0107246 A1* | 4/2010 | Ohta | G06F 21/52 |
| | | | 726/22 |
| 2012/0159143 A1* | 6/2012 | Spradlin | G06F 11/3058 |
| | | | 713/100 |
| 2013/0283368 A1 | 10/2013 | Waddington et al. | |

FOREIGN PATENT DOCUMENTS

| | | |
|---|---|---|
| WO | 2012082525 A2 | 6/2012 |
| WO | 2013039662 A1 | 3/2013 |

\* cited by examiner

FIG. 5
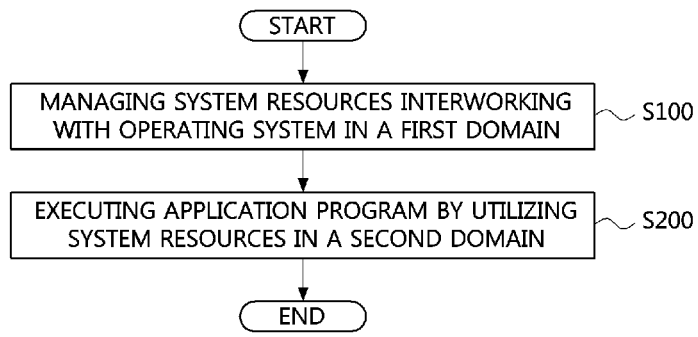
| IDENTIFICATION INFORMATION OF APPLICATION PROGRAM | INFORMATION ON SYSTEM RESOURCE |
|---|---|
| APPLICATION PROGRAM 1 | 0x10, 0x20 |
| APPLICATION PROGRAM 2 | 0x50 |
| . . . | . . . |
FIG. 6
FIG. 7
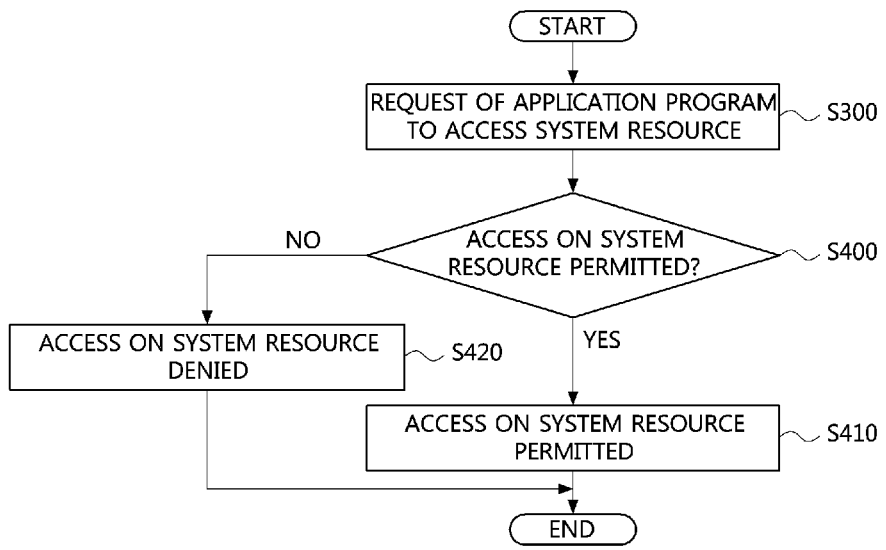

APPARATUS FOR CONFIGURING OPERATING SYSTEM AND METHOD THEREFOR

CROSS-REFERENCE TO RELATED APPLICATIONS

This application claims priority to Korean Patent Application No. 10-2013-0084601, filed on Jul. 18, 2013 in the Korean Intellectual Property Office (KIPO), under 35 U.S.C. §119(a). The entire contents of Korean Patent Application No. 10-2013-0084601 are hereby incorporated by reference.

BACKGROUND

1. Technical Field

Example embodiments of the present invention relate to an operating system, and more specifically to an apparatus and a method for configuring an operating system by separating domains of the operating system so as to guarantee reliability of the operating system.

2. Related Art

An Operating System (OS) is system software providing a user of an information processing apparatus with an environment for using programs conveniently by controlling and managing hardware and system resources such as a memory device, a processor device, an input/output device, a network device, etc.

An operating system comprises a kernel, and may perform functions for efficiently managing hardware or system resources and functions for efficiently operating application programs based on the system resources.

Here, a kernel may be classified into a monolithic kernel and a micro kernel according to its type of module configuration.

In a monolithic kernel type operating system, all functions of the operating system are implemented in an identical address space as a single module.

FIG. 1 is an exemplary view explaining a conventional operating system implemented in a monolithic kernel manner.

Referring to FIG. 1, the operating system 100 using the monolithic kernel manner may comprise a resource allocation manager 110 managing allocation of resources, a resource release manager 120 managing release of resources, and a resource access manager 130 managing accesses on resources in a single module so as to manage system resources 140.

Therefore, management on system resources 140 required for application programs and operations of application programs using the system resources 140 may be performed in the identical address space.

Such the configuration of an operating system is preferred currently since it can enhance performance of the operating system 100.

However, since functions for managing the system resources 140 and functions for operating application programs are performed in the identical address space, if a part of the operating system is destructed, a critical problem may occur in the whole system. Therefore, it has disadvantage of being vulnerable to security and reliability problems.

Thus, the micro kernel manner has been proposed. In the micro kernel type operating system, the kernel is minimized so that minimum functions of the operating system are implemented in a kernel, and the rest of the functions of the operating system are performed in a user mode external to the kernel. As compared with the monolithic kernel, the micro kernel may have advantage of enhancing security and reliability of the operating system.

FIG. 2 is an exemplary view illustrating a conventional operating system implemented in a micro kernel manner.

Referring to FIG. 2, in the operating system 100 using the micro kernel manner, modules are implemented for each of the functions of the operating system 100, and independent address space is provided to each of the modules.

For example, resources 141 related to a functional module for a function #3 and resources 143 related to a functional module for a function #4 may be provided with independent address space for each.

Therefore, for example, in order for an application program to access system resources, inter-module communications comprising several steps, in which the application program transmits a request to a file system module, and then the file system module transmits a request to a storage device driving module, may be required.

Since such the configuration of the operating system provides independent address space according to functions of the operating system, a problem occurring in a module in which a specific function of the operating system is implemented does not affect whole system. Thus, as compared with the monolithic kernel, the micro kernel may have advantage in security and reliability.

However, since each function of the operating system is implemented independently from each other, multi-step inter-module communications are required so that performances of the operating system may be degraded.

SUMMARY

Accordingly, example embodiments of the present invention are provided to substantially obviate one or more problems due to limitations and disadvantages of the related art.

Example embodiments of the present invention provide an apparatus for configuring an operating system by combining a conventional monolithic kernel manner and a conventional micro kernel manner in order for the operating system to support both high performance and high security at the same time.

Example embodiments of the present invention also provide a method for configuring an operating system which enhances reliability of the operating system at the same time of managing system resources efficiently by implementing the operating system having separate domains for managing the system resources and for executing the application program.

In some example embodiments, an apparatus for configuring an operating system may comprise a system resource management part, in a first domain of the operating system, managing system resources by assigning control permissions for the system resources interworking with the operating system; and a system operation part, in a second domain of the operating system which is independent from the first domain, executing an application program by utilizing the system resources managed by the system resource management part.

Also, the first domain and the second domain may be implemented respectively in separate domains of a monolithic kernel, and perform independent functions.

Also, the system resource management part may include a resource allocation module allocating a system resource required for the application program, and generating identification information of the application program and information on the system resource allocated to the application program.

Here, the system resource management part may include an access control information database receiving the identification information of the application program and the information on the system resource, generating access control information by mapping the information on the system resource to the identification information of the application program, and storing the generated access control information.

Here, the system resource management part may include a resource release module deleting the information on the system resource corresponding to the identification information of the application program in the access control information database based on the access control information stored in the access control information database in response to a request of the application program to release the system resource.

Here, the system resource management part may include a resource access module controlling access on the system resource by checking whether the information on the system resource corresponding to the identification information of the application program exist or not in the access control information database based on the access control information stored in the access control information database in response to a request of the application program to access the system resource.

Also, the system resource management part may perform a scheduling function for determining an order of processes constituting the application program.

Also, the system operation part may execute the application program by using an access address of the system resource generated by virtualizing the system resource on which access of the application program is permitted.

Also, the system resource may include at least one of an input/output device, a storage device, and a computation device which are used for executing the application program.

In other example embodiments, a method for configuring an operating system may comprise managing system resources by assigning control permission for the system resources interworking with the operating system in a first domain of the operating system; and executing an application program by utilizing the system resources in a second domain which is independent from the first domain.

Also, the managing system resources and the executing an application program may be performed respectively in the first domain and the second domain of a monolithic kernel.

Here, in the managing system resource, the system resource required for the application program may be allocated, and access control information generated by mapping information on the system resource allocated to the application program to the application program may be stored.

Also, in the managing system resources, whether access of the application program on the system resource on which access of the application is requested is permitted or not may be determined based on the stored access control information in response to a request of the application program to access the system resource.

Also, in the managing system resources, the information on the system resource corresponding to the identification information of the application program may be deleted based on the stored access control information in response to a request of the application program to release the system resource.

Also, in the managing system resources, a scheduling function for determining an order of processes constituting the application program may be performed.

Also, in the executing an application program, the application program may be executed by using an access address of the system resource generated by virtualizing the system resource on which access of the application program is permitted.

BRIEF DESCRIPTION OF DRAWINGS

Example embodiments of the present invention will become more apparent by describing in detail example embodiments of the present invention with reference to the accompanying drawings, in which:

FIG. 5 is an exemplary view explaining access control information according to an example embodiment of the present invention;

FIG. 6 is a flow chart explaining a method for configuring an operating system according to an example embodiment of the present invention; and FIG. 7 is a flow chart explaining a method for controlling access of an application program on a system resource according to an example embodiment of the present invention.

DESCRIPTION OF EXAMPLE EMBODIMENTS

Figure 1:
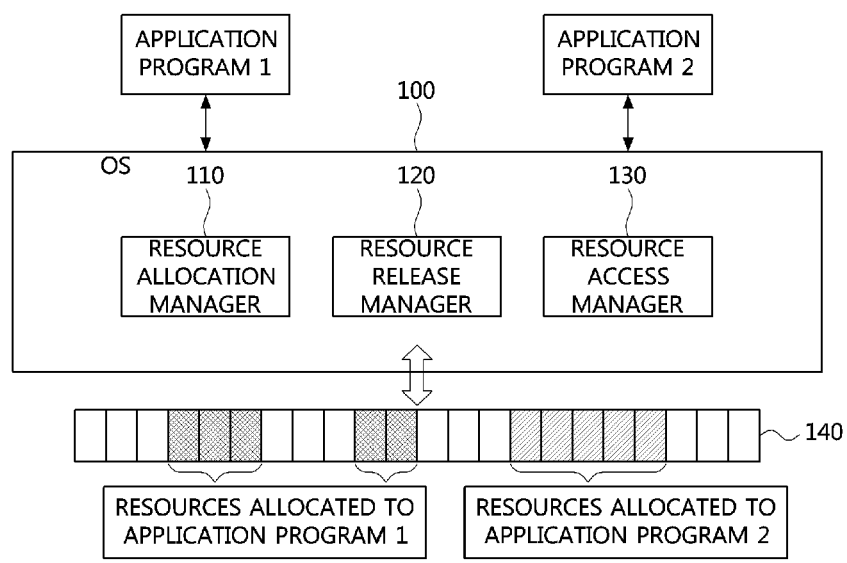
FIG. 1 is an exemplary view explaining a conventional operating system implemented in a monolithic kernel manner.
Figure 2:
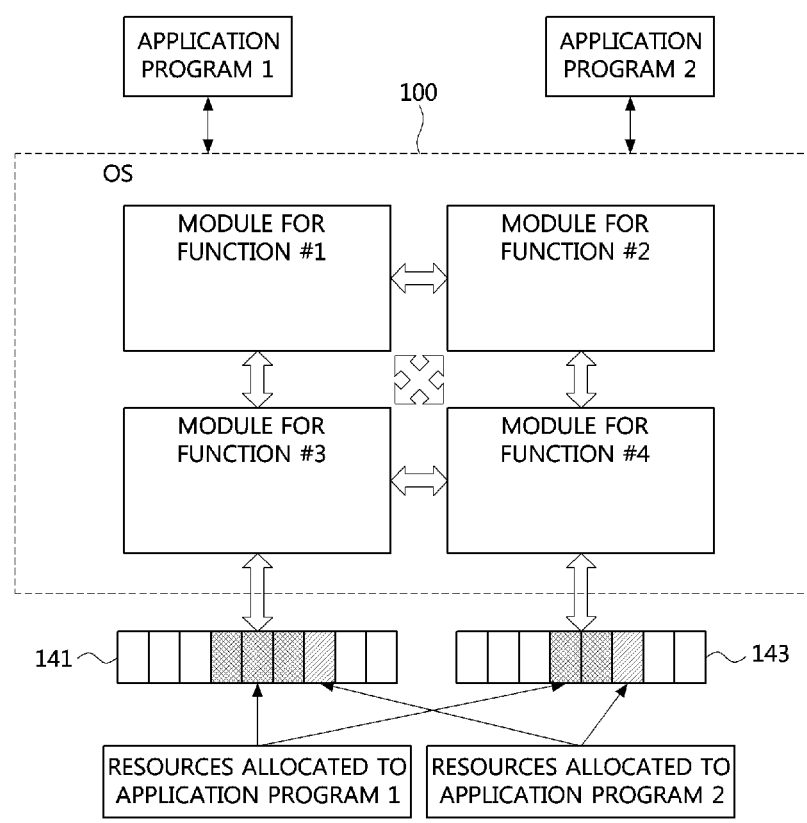
FIG. 2 is an exemplary view illustrating a conventional operating system implemented in a micro kernel manner.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising" "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

An apparatus and a method for configuring an operating system according to an example embodiment of the present invention, which will be explained in the following descriptions, may be implemented in an operating system for information processing apparatuses comprising application programs, an operating system, and hardware such as a computer, a smart phone, a tablet, a server, etc.

Here, an operating system (OS) may perform functions of efficiently managing hardware or system resources required for executing application programs between the application programs and hardware such as input/output devices, network devices, computation devices, storage devices, etc. and functions of efficiently operating application programs based on the system resources. However, functions of the operating system are not restricted to the above-descried examples.

Also, an operating system comprises a kernel. A kernel may be classified into a monolithic kernel and a micro kernel according to its configuration.

Here, in a monolithic kernel type operating system, all functions of the operating system are implemented in an identical address space as a single module so that performances of the operating system can be enhanced. On the contrary, in a micro kernel type operating system, each of all functions of the operating system is implemented as an independent module, and independent address space is provided to each of the modules. Therefore, capability related to securities and reliability may be enhanced in the micro kernel type operating system.

An application program may mean all software which can be executed in the operating system as well as application programs written to meet specific requirements of users using the information processing apparatus through user interfaces provided by the operating system.

Also, the system resources may include at least one of hardware such as input/output devices, storage devices, and computation devices which are used for executing application programs interworking with the operating system.

Here, the input/output device may mean a hardware apparatus such as a mouse, a pen, a keyboard, and a touch screen which can receive execution requests for an application program from a user through user interfaces provided by the operating system, and mean a hardware apparatus such as a printer, a monitor, and a speaker which can provide the user with execution procedures and results of the application program. However, the input/output devices are not restricted to the above-described examples.

Also, the computation devices may include a Central Processing Unit (CPU), a Graphic Processing Unit (GPU), and a General-Purpose Computing on GPU (GPGPU) which process codes of the application program.

Also, the storage devices may include buffers and caches embedded in the computation devices, a Static Random Access Memory (SRAM) device, a Dynamic Random Access Memory (DRAM), a Read-Only Memory (ROM), and a flash memory. However, the storage devices are restricted to the above-described examples.

Hereinafter, preferred example embodiments of the present invention will be explained in detail by referring to figures.

Figure 3:
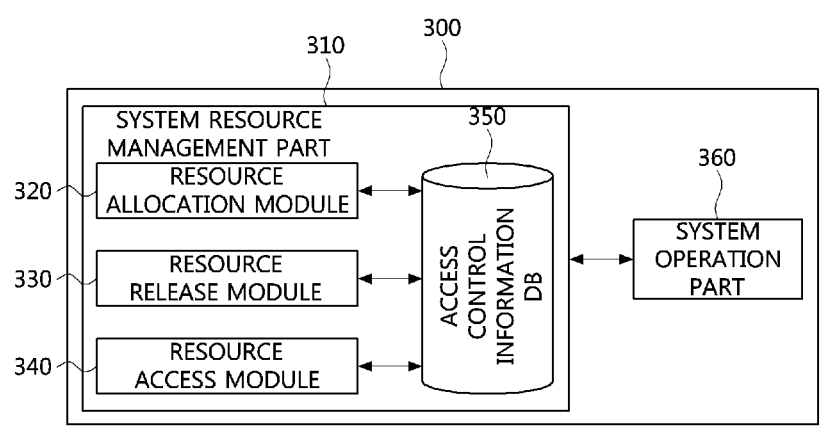
FIG. 3 is a block diagram illustrating an apparatus for configuring an operating system according to an example embodiment of the present invention.

FIG. 3 is a block diagram illustrating an apparatus for configuring an operating system according to an example embodiment of the present invention.

Referring to FIG. 3, an apparatus for configuring an operating system 300 may comprise a system resource management part 310 and a system operation part 360.

The apparatus 300 for configuring an operating system may be implemented in an operating system constituting an information processing apparatus, and a domain for performing management of system resources and a domain for performing execution of application programs may be separated.

Here, an application program may mean all software which can be executed in the operating system as well as application programs written to meet specific requirements of users using the information processing apparatus through user interfaces provided by the operating system. However, the application program is not restricted to the above described examples.

The system resource management part 310 may manage system resources interworking with the operating system in a first domain within the operating system.

Also, the system operation part 360 may execute application programs in a second domain independent from the first domain by utilizing the system resources managed by the system resource management part 310.

Here, the first domain and the second domain may be implemented as separate domains of a monolithic kernel so as to perform functions independent from each other.

Specifically, the operating system is configured by using the monolithic kernel manner which has the better performance, and the micro kernel manner which separates modules according to their functions by implementing functions for managing system resources and functions for executing application programs separately in the first domain and the second domain.

Thereby, the apparatus 300 for configuring an operating system may realize an operating system supporting both better performance of the monolithic kernel manner and system security of the micro kernel manner.

The control permission for the system resources may be assigned by the system resource management part 310, and the system resource management part 310 may control accesses on the system resources.

The system resource management part 310 may comprise a resource allocation module 320, a resource release module 330, a resource access module 340, and an access control information database 350.

The resource allocation module 320 may allocate a system resource demanded by an application program to the application program, and generate identification information of the application program and information on the system resource allocated to the application program.

At this time, the identification information of the application program and the information on the system resource generated when the system resource required for the application program is allocated may be provided to the access control information database 350. The access control information database 350 may record access control information generated by mapping the identification information of the application program to the information on the system resource.

When the application program requests a release of the system resource, the resource release module 330 may delete the information on the system resource corresponding to the identification information of the application program based on the access control information stored in the access control information database.

Here, releasing the system resource may mean that use of the system resource is completed in the application program or that the operating system recovers the system resource to execute other application programs having higher priorities. However, it is not restricted to the above descriptions.

When the application program requests access on a specific system resource, the resource access module 340 may control access on the specific system resource by checking whether information on the system resource corresponding to identification information of the application program exists or not based on the access control information stored in the access control information database.

For example, if the information on the system resource corresponding to the identification information of the application program exists in the access control information database, access on the system resource requested by the application program may be permitted.

Also, the system resource management part 310 may perform a scheduling on priorities of processes for execution of the application program.

Here, the scheduling may mean a resource management function of the operating system which controls system load so as to realize multi-programming by adjusting operation priorities of the processes and order of use of system resources appropriately.

That is, among functions of the operating system, the system resource management part 310 may perform functions for managing system resources and controlling accesses on the system resources based on access right on the system resources.

Here, the system resource may include at least one of input/output devices, storage devices, and computation devices which are used for executing application programs by interworking with the operating system. Also, the system resource may further include a network device for communications between devices, processes or information processing apparatuses.

Overall functions of the operating system except the resource management function implemented in the system resource management part 310 may be implemented in the system operation part 360.

Specifically, the system operation part 360 may generate an access address for a specific system resource by virtualizing the system resource on which access of the application program is permitted so that it can control access of the application program on the system resource.

The access address for a specific system resource may mean a logical address of the specific system resource on which access of the application program is permitted to be used by the application program.

Here, since the actual system resource cannot be accesses by using the logical address of the system resource, the logical address of the system resource may be converted into a physical address of the system resource by using an address converting apparatus such as a Memory Management Unit (MMU) in order to access the actual system resource.

Figure 4:
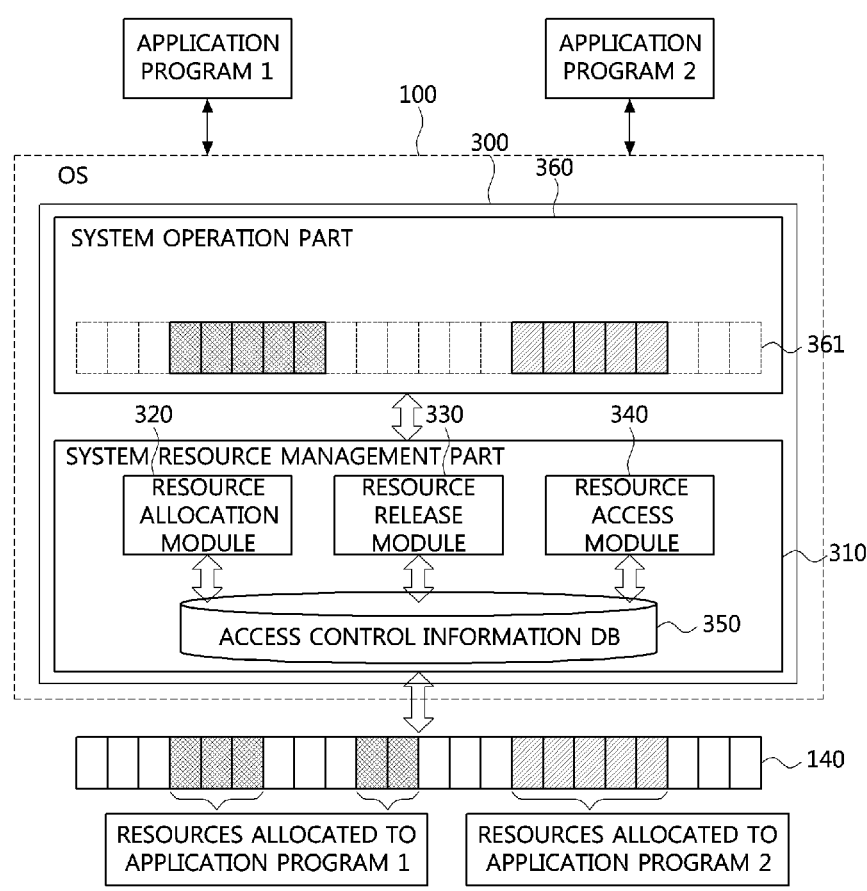
FIG. 4 is an exemplary view explaining an operation of an apparatus for configuring an operating system according to an example embodiment of the present invention.

FIG. 4 is an exemplary view explaining an operation of an apparatus for configuring an operating system according to an example embodiment of the present invention, and FIG. 5 is an exemplary view explaining access control information according to an example embodiment of the present invention.

Referring to FIG. 4 and FIG. 5, the apparatus 300 for configuring an operating system comprising a system resource management part 310 and a system operation part 360 in an operating system 100 may execute an application program by managing a system resource 140.

Here, the system resource management part 310 may implement functions for managing system resources and controlling accesses on the system resources based on access rights on the system resources among functions of the operating system.

Also, overall functions of the operating system except the resource management function implemented in the system resource management part 310 may be implemented in the system operation part 360.

When an application program requests allocation of the system resource 140, the resource allocation module 320 of the system resource management part 310 may allocate the system resource 140 demanded by the application program to the application program, and generate identification information of the application program and information on the system resource allocated to the application program.

As shown in FIG. 5, access control information may be recorded in the access control information database by mapping the identification information of the application program to the information on the system resource demanded by the corresponding application program based on the identification information of the application program and the information on the system resources generated in the resource allocation module 320.

Here, the identification information of the application program may include a unique identification number or a unique identifier of the application program, and the information on the system resource may mean a physical address of the system resource. However, the meanings of the information are not restricted to the above examples.

That is, the access control information may be recorded in a table form which matches the unique identification number or the unique identifier to the physical address of the system resource.

At this time, the system operation part 360 may execute the application program by generating an access address for the system resource by virtualizing the system resource allocated to the application program.

Here, the access address 361 for the system resource may mean a logical address of the system resource on which access of the application program is permitted to be used by the application program.

For example, if the application program tries to access the system resource by using the logical address of the system resource, the logical address of the system resource may be converted into the physical address of the system resource by an address converting apparatus such as a Memory Management Unit (MMU) in the system resource management part 310 so that access on the actual system resource 140 may be controlled.

Therefore, the resource access module 340 in the system resource management part 310 may control accesses on the system resource corresponding to the identification information of the application program by checking whether information on the system resource corresponding to identification information of the application program exist in the access control information database or not.

If the application program requests a release of the system resource 140, the resource release module 330 of the system resource management part 310 may delete the information on the system resource corresponding to the identification information of the application program in the access control information recorded in the access control information database 350.

Here, releasing system resources may mean that use of the system resource is completed in the application program or that the operating system recovers the system resource to execute other application program having higher priority.

FIG. 6 is a flow chart explaining a method for configuring an operating system according to an example embodiment of the present invention.

Referring to FIG. 6, the method may comprise a step S100 for managing system resources interworking with the operating system through a first domain of the operating system, and a step S200 for executing an application program by utilizing the system resources through a second domain of the operating system.

Here, the step S100 for managing system resources and the step S200 for executing application programs may be performed in separate domains of a monolithic kernel.

That is, in the present invention, the operating system is configured basically by using a monolithic kernel having better performance. In addition, the function for managing system resource and the function for executing application programs may be implemented in the separate domains including the first domain and the second domain so that an advantage of a micro kernel enhancing system security may be introduced into the operating system.

Accordingly, an operating system which can support both superior performance of the monolithic kernel and security capability of the micro kernel may be implemented.

The system resource required for the application program may be allocated, and access control information generated by mapping the information on the allocated system resource to the corresponding application program may be recorded in the step S100 of managing system resources.

Also, when the application program request access on the system resource, it may be checked whether the application has access right on the system resource or not based on the access control information.

Therefore, if the information on the system resource corresponding to the identification information of the application program exist, access of the application program on the system resource may be permitted.

When the application program requests a release of the system resource, the information on the system resource corresponding to the identification information of the application may be deleted based on the access control information.

At this time, release of the system resource may mean that use of the system resource is completed in the application program or that the operating system recovers the system resource to execute other application program having higher priority. However, it is not restricted to the above exemplary meanings.

The step S100 of managing system resources may provide a scheduling function of determining an order of processes for executing application programs.

Here, the scheduling may mean a resource management function of the operating system which controls system loads so as to realize multi-programming by adjusting operation priorities of the processes and order of use of system resources appropriately.

The application program may be executed in the second domain independent from the first domain by using the system resource managed in the first domain (S200).

Specifically, the system resource on which access of the application program is permitted may be virtualized by generating an access address for the system resource. The application program may be executed by using the access address.

Here, the access address for the system resource may mean a logical address of the system resource on which access of the application program is permitted to be used by the application program.

FIG. 7 is a flow chart explaining a method for controlling access of an application program on a system resource according to an example embodiment of the present invention.

Referring to FIG. 7, when the application program requests access on a system resource (S300), access on the system resource may be controlled by checking access right of the application program on the system resource (S400).

For example, the application program may request access on the system resource by using the logical address of the system resource (S300).

At this time, the logical address of the system resource may be converted into a physical address of the system resource by using an address converting apparatus such as a Memory Management Unit (MMU) of the system resource management part 310.

Thereby, it may be checked whether information on the system resource corresponding to the identification information of the application program exist or not based on the prerecorded access control information (S400).

Here, the prerecorded access control information may be information recorded by mapping the information on the system resource required by the application program to the identification information of the corresponding application program.

Here, the identification information of the application program may include a unique identification number of the application program or a unique identifier, and the information on the system resource may mean a physical address of the system resource. However, the meanings of the information are not restricted to the above examples.

Therefore, if the information on the system resource required for the application corresponding to the identification information of the application program exist in the access control information database, the access of the application program on the system resource may be permitted (S410).

On the contrary, if the information on the system resource required for the application corresponding to the identification information of the application program do not exist in the access control information database, the access of the application program on the system resource may be denied (S420).

Under the above-described apparatus and method for configuring an operating system according to an example embodiment of the present invention, performances of the operating system may be enhanced at the same time of supporting high security by combining the conventional monolithic kernel manner and the conventional micro kernel manner.

Also, since function for managing system resources of the operating system and functions for operating application programs are configured separately, integrity of the system resources are guaranteed so that reliability of the operating system can be enhanced.

While the example embodiments of the present invention and their advantages have been described in detail, it should be understood that various changes, substitutions and alterations may be made herein without departing from the scope of the invention.

What is claimed is:

1. A non-transitory computer-readable storage medium (CRSM) storing an operating system to be executed on a computer comprising a memory and a processor, the operating system managing the memory and other resources in the computer via the processor, the operating system comprising:
   a system resource management part, in a first domain of the operating system, managing system resources by assigning control permissions for the system resources interworking with the operating system; and
   a system operation part, in a second domain of the operating system which is independent from the first domain, executing an application program by utilizing the system resources managed by the system resource management part,
   wherein the system resource management part includes a resource allocation module allocating a system resource required for the application program, and generating identification information of the application program and information on the system resource allocated to the application program, and
   wherein the system resource management part includes an access control information database receiving the identification information of the application program and the information on the system resource, generating access control information by mapping the information on the system resource to the identification information of the application program, and storing the generated access control information.

2. The non-transitory CRSM of claim 1, wherein the operating system comprises a monolithic kernel, and wherein the first domain and the second domain are implemented respectively in separate domains of the monolithic kernel, and perform independent functions.

3. The non-transitory CRSM of claim 1, wherein the system resource management part includes a resource release module deleting the information on the system resource corresponding to the identification information of the application program in the access control information database based on the access control information stored in the access control information database in response to a request of the application program to release the system resource.

4. The non-transitory CRSM of claim 1, wherein the system resource management part includes a resource access module controlling access on the system resource by checking whether the information on the system resource corresponding the identification information of the application program exist or not in the access control information database based on the access control information stored in the access control information database in response to a request of the application program to access the system resource.

5. The non-transitory CRSM of claim 1, wherein the system resource management part performs a scheduling function for determining an order of processes constituting the application program.

6. The non-transitory CRSM of claim 1, wherein the system operation part executes the application program by using an access address of the system resource generated by virtualizing the system resource on which access of the application program is permitted.

7. The non-transitory CRSM of claim 1, wherein the system resource includes at least one of an input/output device, a storage device, and a computation device which are used for executing the application program.

8. A processing method of an operating system that is executed on a computer comprising a memory and a processor, the operating system managing the memory and other resources in the computer via the processor, the processing method comprising:
   managing system resources by assigning control permission for the system resources interworking with the operating system in a first domain of the operating system; and
   executing an application program by utilizing the system resources in a second domain which is independent from the first domain,
   wherein, in the managing system resources, the system resource required for the application program is allocated, and access control information generated by mapping information on the system resource allocated to the application program to the application program are stored, and
   wherein, in the managing system resources, whether access of the application program on the system resource on which access of the application is requested is permitted or not is determined based on the stored access control information in response to a request of the application program to access the system resource.

9. The processing method of claim 8, wherein the operating system comprises a monolithic kernel, and wherein the managing system resources and the executing an application program are performed respectively in the first domain and the second domain of the monolithic kernel.

10. The processing method of claim 8, wherein, in the managing system resources, the information on the system resource corresponding to the identification information of the application program is deleted based on the stored access control information in response to a request of the application program to release the system resource.

11. The processing method of claim 8, wherein, in the managing system resources, a scheduling function for determining an order of processes constituting the application program is performed.

12. The processing method of claim 8, wherein, in the executing the application program, the application program is executed by using an access address of the system resource generated by virtualizing the system resource on which access of the application program is permitted.

* * * * *